(12) United States Patent
Liang et al.

(10) Patent No.: US 11,417,056 B2
(45) Date of Patent: Aug. 16, 2022

(54) METHOD, APPARATUS, DEVICE AND STORAGE MEDIUM FOR THREE-DIMENSIONAL RECONSTRUCTION

(71) Applicant: BEIJING BAIDU NETCOM SCIENCE AND TECHNOLOGY CO., LTD., Beijing (CN)

(72) Inventors: Borong Liang, Beijing (CN); Zhibin Hong, Beijing (CN); Zhizhi Guo, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/304,295

(22) Filed: Jun. 17, 2021

(65) Prior Publication Data

US 2021/0312707 A1 Oct. 7, 2021

(30) Foreign Application Priority Data

Nov. 30, 2020 (CN) .......................... 202011372419.1

(51) Int. Cl.
*G06T 17/00* (2006.01)
*G06T 7/80* (2017.01)
*G06T 7/55* (2017.01)

(52) U.S. Cl.
CPC ............... *G06T 17/00* (2013.01); *G06T 7/55* (2017.01); *G06T 7/80* (2017.01); *G06T 2207/10024* (2013.01); *G06T 2207/10028* (2013.01)

(58) Field of Classification Search
None
See application file for complete search history.

(56) References Cited

U.S. PATENT DOCUMENTS

| 2016/0291592 | A1* | 10/2016 | Matthews | ............. G06T 3/0012 |
| 2017/0243069 | A1* | 8/2017 | Shen | .......................... G06T 7/80 |
| 2019/0147613 | A1* | 5/2019 | Ren | ....................... G06K 9/6282 |
| | | | | 382/103 |

FOREIGN PATENT DOCUMENTS

| CN | 17 590 832 | 1/2018 |
| CN | 111 243 093 | 6/2020 |

OTHER PUBLICATIONS

Extended European Search Report dated Dec. 3, 2021 for European Patent Application No. 21179328.6. 9 pages.
Lin, Xiaohu, et al., "An Automatic Key-Frame Selection Method for Monocular Visual Odometry of Ground Vehicle". vol. 7.

* cited by examiner

*Primary Examiner* — Frank S Chen
(74) *Attorney, Agent, or Firm* — Knobbe, Martens, Olson & Bear, LLP

(57) ABSTRACT

A method, an apparatus, a device and a storage medium for three-dimensional reconstruction are provided. The method may include: acquiring a sequence of RGBD images of a target; determining a set of first three-dimensional key points of the target on each RGBD image for the each RGBD image in the sequence of the RGBD images; transferring the set of the first three-dimensional key points to a camera coordinate system to obtain a set of second three-dimensional key points of the target in the camera coordinate system; calculating an Euler angle of the each RGBD image based on the set of the second three-dimensional key points; selecting an RGBD image based on the Euler angle; and performing three-dimensional reconstruction of the target based on the selected RGBD image to obtain a three-dimensional model of the target.

20 Claims, 5 Drawing Sheets

METHOD, APPARATUS, DEVICE AND STORAGE MEDIUM FOR THREE-DIMENSIONAL RECONSTRUCTION

CROSS-REFERENCE TO RELATED APPLICATIONS

This application claims the priority of Chinese Patent Application No. 202011372419.1, titled "METHOD, APPARATUS, DEVICE AND STORAGE MEDIUM FOR THREE-DIMENSIONAL RECONSTRUCTION", filed on Nov. 30, 2020, the content of which is incorporated herein by reference in its entirety.

TECHNICAL FIELD

Embodiments of the present disclosure relate to the field of computer technology, specially, to the technical field of artificial intelligence, such as computer vision and deep learning, and in particular, to a method, apparatus, device and storage medium for three-dimensional reconstruction.

BACKGROUND

Generally, the RGBD images acquired by depth cameras are very dense. For example, in the process of face scanning, a depth camera will acquire hundreds of frames of RGBD images of the face. However, the RGBD images are mainly stored in the form of pictures, and a large number of the RGBD images require a large amount of storage and network transmission resources. In addition, a large amount of storage and network transmission resources need to be used to reconstruct all the frames of the RGBD images.

SUMMARY

Embodiments of the present disclosure provide a method, apparatus, device and storage medium for three-dimensional reconstruction.

According to a first aspect, an embodiment of the present disclosure provides a method for three-dimensional reconstruction, and the method includes: acquiring a sequence of RGBD images of a target; determining, for an RGBD image in the sequence of the RGBD images, a set of first three-dimensional key points of the target on the RGBD image; transferring the set of the first three-dimensional key points to a camera coordinate system to obtain a set of second three-dimensional key points of the target in the camera coordinate system; calculating an Euler angle of the RGBD image based on the set of the second three-dimensional key points; selecting a second RGBD image from the set of RGBD images of the target based on the Euler angle; and performing three-dimensional reconstruction of the target based on the selected second RGBD image to obtain a three-dimensional model of the target.

According to a second aspect, an embodiment of the present disclosure provides an apparatus for three-dimensional reconstruction, and the apparatus includes: an acquisition module configured to acquire a sequence of RGBD images of a target; a determination module configured to determine, for an RGBD image in the sequence of the RGBD images, a set of first three-dimensional key points of the target on the RGBD image; a transfer module configured to transfer the set of the first three-dimensional key points to a camera coordinate system to obtain a set of second three-dimensional key points of the target in the camera coordinate system; a calculation module configured to calculate an Euler angle of the RGBD image based on the set of the second three-dimensional key points; a selection module configured to select a second RGBD image from the set of RGBD images of the target based on the Euler angle; and a reconstruction module configured to perform three-dimensional reconstruction of the target based on the selected second RGBD image to obtain a three-dimensional model of the target.

According to a third aspect, an embodiment of the present disclosure provides an electronic device, and the electronic device includes: at least one processor; and a memory communicatively connected with the at least one processor, where the memory stores instructions executable by the at least one processor, and the instructions, when executed by the at least one processor, cause the at least one processor to perform the method as described in any one of the implementations of the first aspect.

According to a fourth aspect, an embodiment of the present disclosure provides a non-transitory computer readable storage medium storing computer instructions, where the computer instructions cause a computer to perform the method as described in any one of the implementations of the first aspect.

It should be appreciated that the content described in this section is not intended to identify the key or critical features of embodiments of the present disclosure, nor is it intended to limit the scope of the present disclosure. The other features of the present disclosure will become easy to understand through the following description.

BRIEF DESCRIPTION OF THE DRAWINGS

By reading the detailed description of non-limiting embodiments with reference to the following accompanying drawings, other features, objects and advantages of the present disclosure will become more apparent. The accompanying drawings are intended to provide a better understanding of the present disclosure and do not constitute a limitation to the present disclosure.

DETAILED DESCRIPTION OF EMBODIMENTS

Example embodiments of the present disclosure are described below in combination with the accompanying drawings, where various details of embodiments of the present disclosure are included to facilitate understanding and should be considered as examples only. Therefore, those of ordinary skill in the art should realize that various changes and modifications may be made to embodiments described herein without departing from the scope and spirit of the present disclosure. Similarly, for clarity and conciseness, descriptions of well-know functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
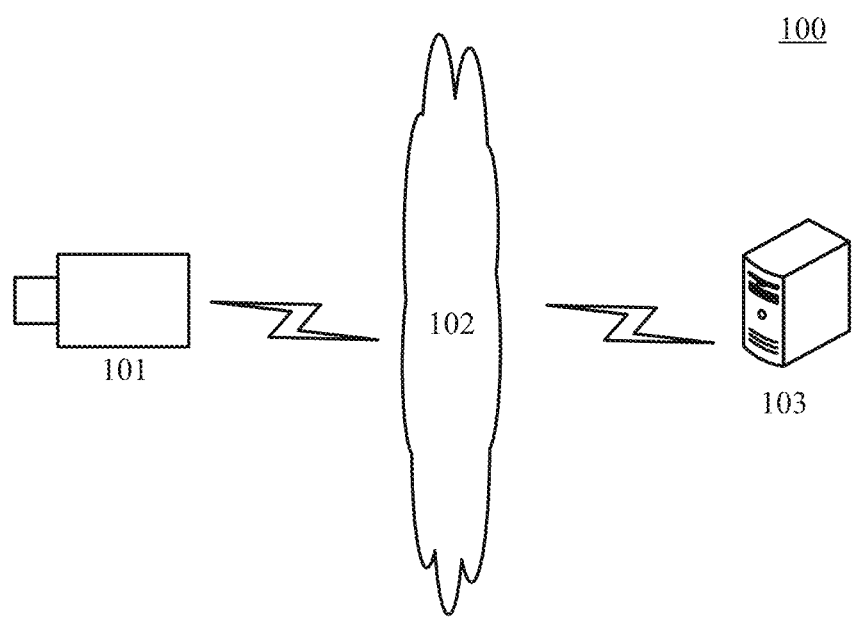
FIG. 1 is an example system architecture to which some embodiments of the present disclosure may be applied.

FIG. 1 shows an example system architecture 100 to which embodiments of a method or apparatus for three-dimensional reconstruction of some embodiments of the present disclosure may be applied.

As shown in FIG. 1, the system architecture 100 may include a camera 101, a network 102 and a server 103. The network 102 serves as a medium for providing a communication link between the camera 101 and the server 103. The network 102 may include various types of connections, such as wired or wireless communication links, or optical fiber cables.

The camera 101 may interact with the server 103 via the network 102 to receive or send messages or the like. For example, the camera 101 may acquire a RBGD image sequence of a target and transmit the sequence to the server 103.

The server 103 may provide various services. For example, the server 103 may perform processing, such as analysis on the RGBD image sequence of the target received from the camera 101 to generate a processing result (for example, a three-dimensional model of the target).

It should be noted that the server 103 may be hardware or software. When the server 103 is hardware, the server 103 may be implemented as a distributed server cluster composed of multiple servers, or as a single server. When the server 103 is software, the server 103 may be implemented as multiple software pieces or software modules (such as for providing distributed services), or as a single software piece or software module, which is not specifically limited herein.

It should be noted that the method for three-dimensional reconstruction provided by some embodiments of the present disclosure is generally performed by the server 103. Correspondingly, the apparatus for three-dimensional reconstruction is generally provided in the server 103.

It should be appreciated that the number of the camera, the network and the server in FIG. 1 is merely illustrative. Any number of cameras, networks and servers may be provided according to actual requirements.

Figure 2:
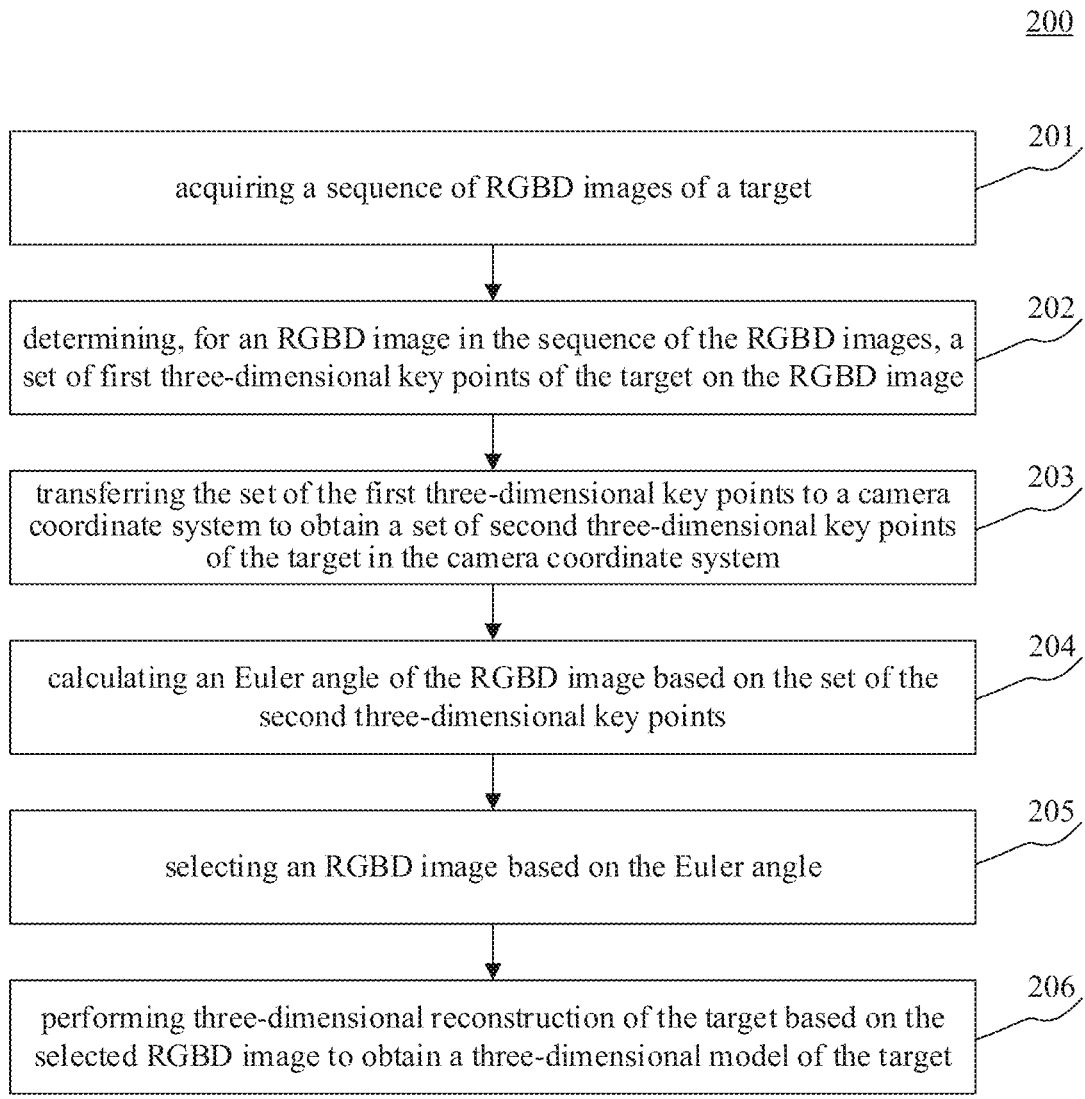
FIG. 2 is a flowchart of an embodiment of a method for three-dimensional reconstruction according to some embodiments of the present disclosure.

Further referring to FIG. 2, a flow 200 of an embodiment of the method for three-dimensional reconstruction according to the present disclosure is shown. The method for three-dimensional reconstruction includes steps 201 to 206.

Step 201 includes acquiring a sequence of RGBD images of a target.

In some embodiments, the execution body of the method for three-dimensional reconstruction (for example, the server 103 shown in FIG. 1) may acquire the sequence of the RGBD images of the target from a depth camera (for example, the camera 101 shown in FIG. 1). For example, a terminal device may invoke the API (Application Programming Interface) of the depth camera to acquire the sequence of the RGBD images of the target.

In general, the depth camera may scan the target and acquire a sequence of RGBD images including a large number of RGBD images. An RGBD image may include an RGB image and a depth image. The pixel value of each pixel point of the RGB image may be the color value of each point of the target surface. Generally, all colors perceivable by human vision are obtained by changing the three color channels of red (R), green (G) and blue (B) and superimposing the three colors with each other. The pixel value of each pixel point of the depth image may be the distance between the depth camera and each point of the target surface. Generally, the RGB image and the depth image are registered, so that there is a one-to-one corresponding relationship between the pixel points of the RGB image and the pixel points of the depth image.

Step 202 includes determining, for an RGBD image in the sequence of the RGBD images, a set of first three-dimensional key points of the target on the RGBD image.

In some embodiments, for the RGBD image in the sequence of the RGBD images, the execution body may determine the set of the three-dimensional key points of the target on the RGBD image as the set of the first three-dimensional key points. The key points of the target are the key semantic points of the target, and a set composed of a large number of the key points of the target is the set of the key points. Since the RGBD image has two-dimensional information of the RGB image and depth information of the depth image, the key points of the target on the RGBD image have three-dimensional information, and are three-dimensional key points.

Taking a human face as an example, a set of key points of the human face may include about 150 key points of the human face, including but not limited to at least one of: positions, contour information or shape information of human facial organs.

Step 203 includes transferring the set of the first three-dimensional key points to a camera coordinate system to obtain a set of second three-dimensional key points of the target in the camera coordinate system.

In some embodiments, the execution body may transfer the set of the first three-dimensional key points to the camera coordinate system to obtain the set of the three-dimensional key points of the target in the camera coordinate system as the set of the second three-dimensional key points.

Generally, the execution body may transfer the set of the first three-dimensional key points to the camera coordinate system by using a spatial three-dimensional coordinate transformation to obtain the set of the second three-dimensional key points. The spatial three-dimensional coordinate transformation may include, but is not limited to, a rotation matrix and rotation vector, an Euler angle, a quaternion and the like.

Step 204 includes calculating an Euler angle of the RGBD image based on the set of the second three-dimensional key points.

In some embodiments, the execution body may calculate the Euler angle of the RGBD image based on the set of the second three-dimensional key points. The Euler angle of the RGBD image may be a relative Euler angle or an absolute Euler angle. The relative Euler angle is the Euler angle between adjacent RGBD images in the sequence of the RGBD images. The absolute Euler angle may be the Euler angle of the RGBD image in the sequence of the RGBD images relative to the first frame of the RGBD images.

Step 205 includes selecting an RGBD image based on the Euler angle.

In some embodiments, the execution body may select the RGBD image based on the Euler angle. For example, in the case where the Euler angle is a relative Euler angle, for adjacent RGBD images with a relatively small Euler angle, only one RGBD image is selected from the adjacent RGBD images; and for adjacent RGBD images with a relatively large Euler angle, the adjacent RGBD images are both selected. For another example, when the Euler angles are absolute Euler angles, the absolute Euler angles are divided into multiple ranges, the RGBD images are selected from the sequence of the RGBD images, by ensuring that an Euler angle in each range is selected.

Step 206 includes performing three-dimensional reconstruction of the target based on the selected RGBD image to obtain a three-dimensional model of the target.

In some embodiments, the execution body may perform the three-dimensional reconstruction of the target based on the selected RGBD image to obtain the three-dimensional model of the target.

Generally, the selected RGBD images are the key frames of the sequence of the RGBD images and are sparse. Meanwhile, since the selected RGBD images have accurate Euler angles, the Euler angles can be used for preliminary alignment during the reconstruction, so that the number of iterations in the reconstruction process is greatly reduced, and the success rate of the reconstruction is improved.

According to the method for three-dimensional reconstruction provided by some embodiments of the present disclosure, for the RGBD image in the acquired sequence of the RGBD images, the set of the first three-dimensional key points of the target on the RGBD image is first determined; the set of the first three-dimensional key points is transferred to the camera coordinate system to obtain the set of the second three-dimensional key points of the target in the camera coordinate system; the Euler angle of the RGBD image is calculated based on the set of the second three-dimensional key points; and after the Euler angle of the RGBD image in the sequence of the RGBD images is obtained, the RGBD image is selected based on the Euler angle; and finally the three-dimensional reconstruction of the target is performed based on the selected RGBD image to obtain the three-dimensional model of the target. By selecting key frames from the sequence of the RGBD images according to the Euler angle of the RGBD image, the key frames containing the main information of the sequence of the RGBD images can be retained as much as possible, thereby improving the accuracy of the selected key frames. Using the key frames for the three-dimensional reconstruction can save storage and network transmission resources while ensuring the effect of the three-dimensional reconstruction, and in the case of the three-dimensional face reconstruction, the storage and network transmission costs in the three-dimensional face reconstruction are greatly reduced.

Figure 3:
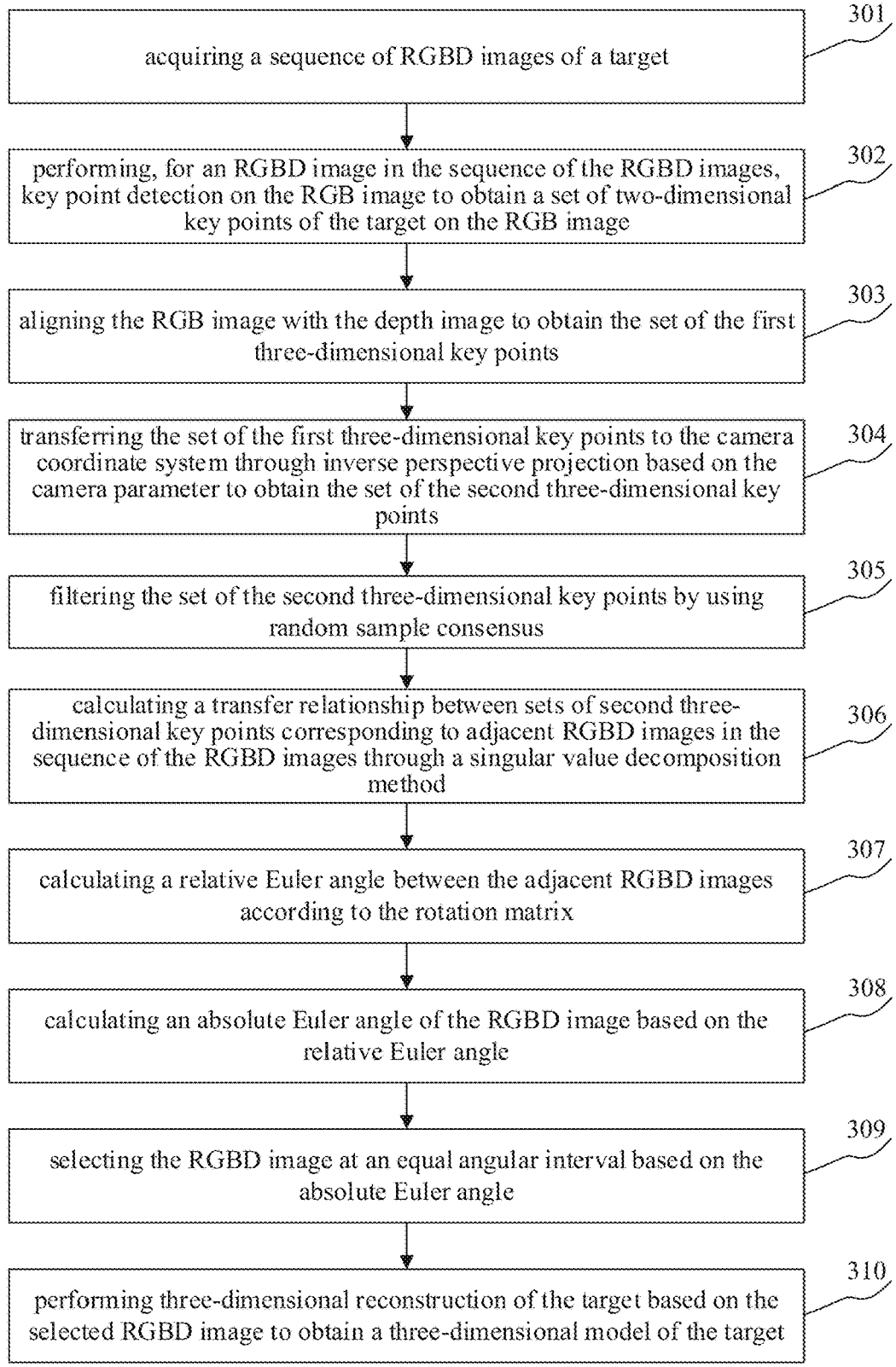
FIG. 3 is a flowchart of another embodiment of the method for three-dimensional reconstruction according to some embodiments of the present disclosure.

Further referring to FIG. 3, a flow 300 of another embodiment of the method for three-dimensional reconstruction according to some embodiments of the present disclosure is shown. The method for three-dimensional reconstruction includes steps 301 to 310.

Step 301 includes acquiring a sequence of RGBD images of a target.

In some embodiments, the execution body may acquire the sequence of the RGBD images of the target from a depth camera. An RGBD image may include an RGB image, a depth image and a camera parameter. The camera parameters of different models of depth cameras may be different, and the camera parameters are parameters related to the characteristics of the depth camera itself, including but not limited to parameters, such as a camera focal length, a camera optical center and the like.

Step 302 includes performing, for an RGBD image in the sequence of the RGBD images, key point detection on the RGB image to obtain a set of two-dimensional key points of the target on the RGB image.

In some embodiments, for the image in the sequence of the RGBD images, the key point detection is performed on the RGB image to obtain the set of the two-dimensional key points of the target on the RGB image. The key points of the target are the key semantic points of the target, and a set of a large number of the key points of the target is the set of the key points. Since the RGB image has only two-dimensional information, the key points of the target on the RGB image has two-dimensional information and are two-dimensional key points.

Generally, the set of the two-dimensional key points of the target on the RGB image can be detected by a conventional detection mode, or a deep learning detection mode. The accuracy of the deep learning detection mode is generally higher than the accuracy of the conventional detection mode. The conventional detection mode may be, for example, significance detection. The deep learning detection mode may be, for example, deep learning model detection. Specifically, the set of the two-dimensional key points may be obtained by performing the key point detection on the RGB image by using the key point detection model. Taking a human face as an example, a human-face key point detection model is used to detect the key points of the human face on an RGB image to obtain the two-dimensional coordinates of about 150 key points of the human face on the RGB image.

Step 303 includes aligning the RGB image with the depth image to obtain the set of the first three-dimensional key points.

In some embodiments, the execution body may align the RGB image with the depth image to obtain the set of the first three-dimensional key points.

In practice, there is a one-to-one corresponding relationship between the pixel points of the RGB image and the pixel points of the depth image in the RGBD image. For the two-dimensional key points of the target on the RGB image, the depth values of the two-dimensional key points in the depth image can be found by aligning the RGB image with the depth image, thereby obtaining the corresponding three-dimensional key points. By performing the key point detection on the RGB image, and using the one-to-one corresponding relationship between the pixel points of the RGB image and the pixel points of the depth image, the set of the first three-dimensional key points of the target on the RGBD image can be quickly obtained, thereby improving the acquisition efficiency of the set of the first three-dimensional key points.

Step 304 includes transferring the set of the first three-dimensional key points to the camera coordinate system through inverse perspective projection based on the camera parameter to obtain the set of the second three-dimensional key points.

In some embodiments, the execution body may transfer the set of the first three-dimensional key points to the camera coordinate system through inverse perspective projection based on the camera parameter to obtain the set of the second three-dimensional key points. Specifically, a camera focal length and a camera optical center are first acquired from the camera parameter; and then the inverse perspective projection is performed by using the camera focal length, the camera optical center and depth values of the three-dimensional key points in the set of the first three-dimensional key points to obtain the set of the second three-dimensional key points. The inverse perspective projection is performed based on the camera parameter, which can quickly obtain, through the projection, the set of the second three-dimensional key points in the camera coordinate system, thereby improving the acquisition efficiency of the set of the second three-dimensional key points.

Step 305 includes filtering the set of the second three-dimensional key points by using random sample consensus.

In some embodiments, for an RGBD image with a large angle (for example an RGBD image of a side face with a large angle), the depth values of the two-dimensional key points in the depth image may have a large error. If the two-dimensional key points with a large error are converted to points in the camera coordinate system, the two-dimensional key points with a large error cause a large change of the semantics of the corresponding second three-dimensional key points, thereby affecting the calculation of the transfer relationship of the RGBD image. Therefore, in order to obtain the second three-dimensional key points with a small error, the set of the second three-dimensional key points may be filtered by RANSAC (random sample consensus), and the transfer relationship of the RGBD image may be calculated for the filtered set of the second three-dimensional key points. The set of the second three-dimensional key points is filtered by using random sample consensus, so that a second three-dimensional key point whose depth value has a large error is filtered out, and the transfer relationship is calculated by using only a second three-dimensional key point whose depth value has a small error, thereby improving the accuracy of the transfer relationship.

Step 306 includes calculating a transfer relationship between sets of second three-dimensional key points corresponding to adjacent RGBD images in the sequence of the RGBD images through a singular value decomposition method.

In some embodiments, for the adjacent RGBD images in the sequence of the RGBD images, the execution body may calculate the transfer relationship between the sets of the second three-dimensional key points corresponding to the adjacent RGBD images through a singular value decomposition method. The transfer relationship may include a rotation matrix, a translation parameter, a scaling factor and the like. Since the set of the second three-dimensional key points used to calculate the transfer relationship has filtered out the second three-dimensional key point with a large error, the accuracy of the calculated transfer relationship between the adjacent RGBD images is improved.

Step 307 includes calculating a relative Euler angle between the adjacent RGBD images according to the rotation matrix.

In some embodiments, the execution body may calculate the relative Euler angle between the adjacent RGBD images according to the rotation matrix.

It should be noted that relative Euler angles between any adjacent RGBD images in the sequence of the RGBD images are calculated through the above manner.

Step 308 includes calculating an absolute Euler angle of the RGBD image based on the relative Euler angle.

In some embodiments, the execution body may calculate the absolute Euler angle of the RGBD image based on the relative Euler angle. Since the execution body has calculated the relative Euler angles between any adjacent RGBD images in the sequence of the RGBD images, the relative Euler angles between the adjacent RGBD images in the sequence of the RGBD images are sequentially added to obtain the corresponding absolute Euler angles.

The transfer relationship corresponding to the adjacent RGBD images is obtained through the singular value decomposition method, and the relative Euler angles between the adjacent RGBD images are calculated based on the transfer relationship, and then the absolute Euler angles are obtained, so that the absolute Euler angles of the RGBD images in the sequence of the RGBD images can be quickly calculated, thereby improving the acquisition efficiency of the absolute Euler angles.

Step 309 includes selecting the RGBD image at an equal angular interval based on the absolute Euler angle.

In some embodiments, the execution body may select RGBD images at an equal angular interval based on absolute Euler angles, so that RGBD images are more evenly selected.

Step 310 includes performing three-dimensional reconstruction of the target based on the selected RGBD image to obtain a three-dimensional model of the target.

In some embodiments, the detailed operation of step 310 are described in detail in step 206 in the embodiment shown in FIG. 2, and are thus not repeated herein.

As can be seen from FIG. 3, compared with the embodiment corresponding to FIG. 2, the flow 300 of the embodiment of the method for three-dimensional reconstruction highlights the steps of acquiring the set of the first three-dimensional key points, the set of the second three-dimensional key points and the absolute Euler angles, and selecting the RGBD images. In addition, a filtering step is added. The key point detection is performed on the RGB image, and the one-to-one corresponding relationship between the pixel points of the RGB image and the pixel points of the depth image can be used to quickly obtain the set of the first three-dimensional key points of the target on the RGBD image, thereby improving the acquisition efficiency of the set of the first three-dimensional key points. The inverse perspective projection is performed based on the camera parameter, which can quickly project the set of the second three-dimensional key points in the camera coordinate system, thereby improving the acquisition efficiency of the set of the second three-dimensional key points. The transfer relationship corresponding to the adjacent RGBD images is obtained through the singular value decomposition method, and the relative Euler angles between the adjacent RGBD images are calculated based on the transfer relationship, and then the absolute Euler angles are obtained, so that the absolute Euler angles of the RGBD images in the sequence of the RGBD images can be quickly calculated, thereby improving the acquisition efficiency of the absolute Euler angles. The set of the second three-dimensional key points is filtered by using random sample consensus, so that a second three-dimensional key point whose depth value has a large error is filtered out, and the transfer relationship is calculated by using only a second three-dimensional key point whose depth value has a small error, thereby improving the accuracy of the transfer relationship. In addition, the accurate inter-frame relationship obtained by selecting the key frames can be used for initialization in the reconstruction, thereby reducing the calculation time of the reconstruction and improving the effect of the reconstruction.

Figure 4:
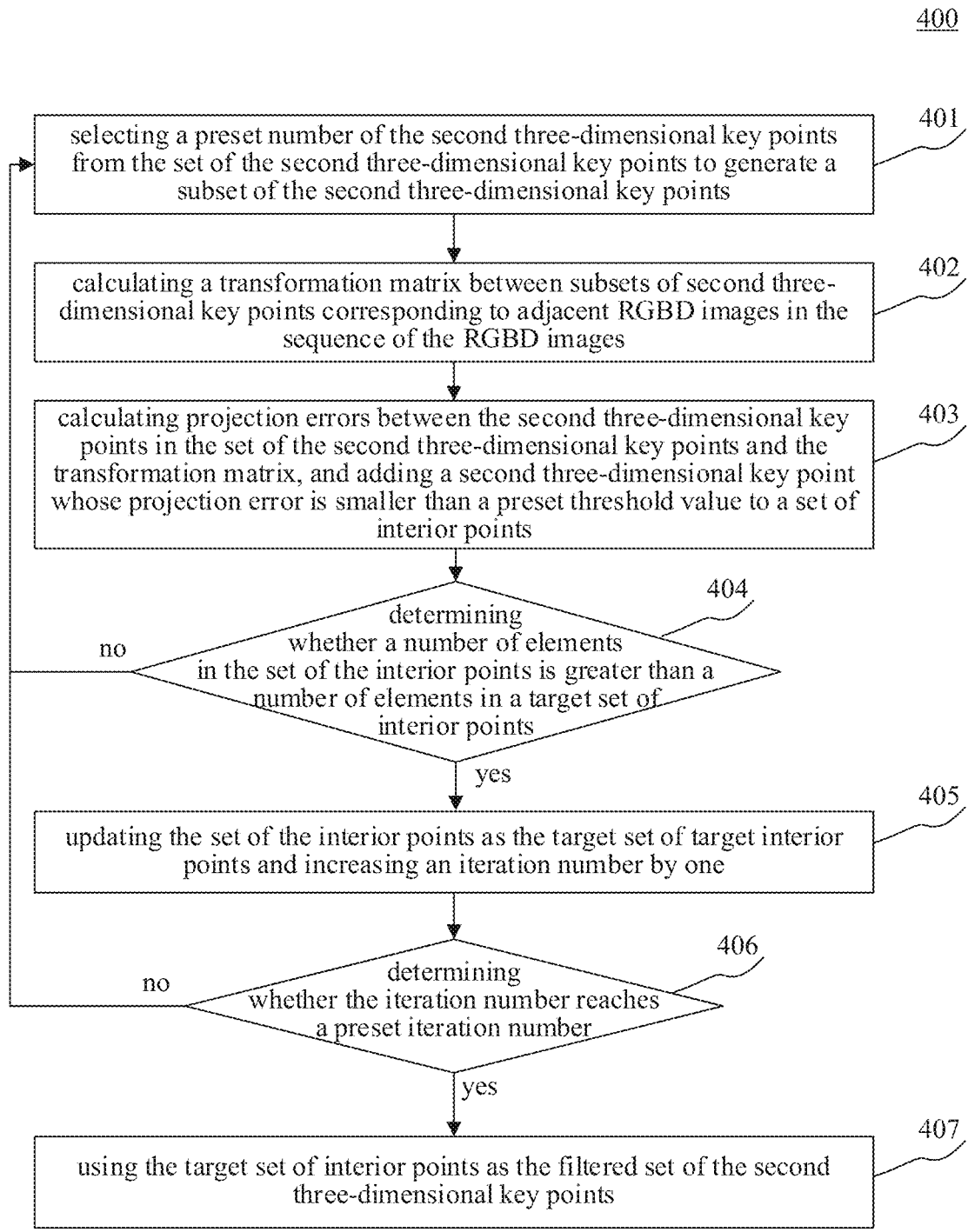
FIG. 4 is an exploded flowchart of a filtering step in the method for three-dimensional reconstruction shown in FIG. 3, according to some embodiments.

Further referring to FIG. 4, an exploded flow 400 of a filtering step in the method for three-dimensional reconstruction shown in FIG. 3 is shown. The filtering step may be exploded as steps 401 to 407.

Step 401 includes selecting a preset number of the second three-dimensional key points from the set of the second three-dimensional key points to generate a subset of the second three-dimensional key points.

In some embodiments, the execution body may select the preset number of the second three-dimensional key points from the set of the second three-dimensional key points to generate the subset of the second three-dimensional key points. For example, five second three-dimensional key points are randomly selected from the set of the second three-dimensional key points.

Step 402 includes calculating a transformation matrix between subsets of second three-dimensional key points corresponding to adjacent RGBD images in the sequence of the RGBD images.

In some embodiments, for the adjacent RGBD images in the sequence of the RGBD images, the execution body may calculate the transformation matrix between the subsets of the second three-dimensional key points corresponding to the adjacent RGBD images in the sequence of the RGBD images, and use the transformation matrix as an initial model.

Step 403 includes calculating projection errors between the second three-dimensional key points in the set of the second three-dimensional key points and the transformation matrix, and adding a second three-dimensional key point whose projection error is smaller than a preset threshold value to a set of interior points.

In some embodiments, the execution body may first calculate the projection errors between the second three-dimensional key points in the set of the second three-dimensional key points corresponding to the adjacent RGBD images and the transformation matrix, and then determine whether the projection errors are smaller than the preset threshold value. If a projection error is smaller than the preset threshold value, a corresponding second three-dimensional key point is added to the set of interior points; and if a projection error is not smaller than the preset threshold value, the projection error between the next second three-dimensional key point and the transformation matrix is calculated.

Step 404 includes determining whether a number of elements in the set of the interior points is greater than a number of elements in a target set of interior points.

In some embodiments, the execution body may filter the set of the second three-dimensional key points based on the set of the interior points. Specifically, when all the second three-dimensional key points corresponding to the sequence of the RGBD images are iterated, the execution body may determine whether the number of elements in the set of the interior points is greater than the number of elements in the target set of interior points. If the number of elements in of the set of the interior points is greater than the number of elements in the target set of interior points, step 405 is performed; and if the number of elements in the set of the interior points is not greater than the number of elements in the target set of interior points, the process returns to step 401 and the subset of the second three-dimensional key points is re-selected to continue the iteration. At the first iteration, the target set of interior points may be empty.

Step 405 includes updating the set of the interior points as the target set of target interior points and increasing an iteration number by one.

In some embodiments, if the number of elements in the set of the interior points is greater than the number of elements in the target set of interior points, the execution body may update the set of the interior points as the target set of interior points and increase the iteration number by one.

Step 406 includes determining whether the iteration number reaches a preset iteration number.

In some embodiments, the execution body may determine whether the iteration number reaches the preset iteration number. If the iteration number reaches the preset iteration number, step 407 is performed; and if the iteration number does not reach the preset iteration number, the process returns to step 401 and the subset of the second three-dimensional key points is re-selected to continue the iteration.

Step 407 includes using the target set of interior points as the filtered set of the second three-dimensional key points.

In some embodiments, if the iteration number reaches the preset iteration number, the execution body may use the target set of interior points as the filtered set of the second three-dimensional key points. In this case, the filtering of the set of the second three-dimensional key points is completed.

According to the filtering method provided by some embodiments of the present disclosure, the set of the second three-dimensional key points is iteratively filtered through the set of the interior points, so that the filtering accuracy is improved. The iteration number is set so that the filtering time can be controlled.

Figure 5:
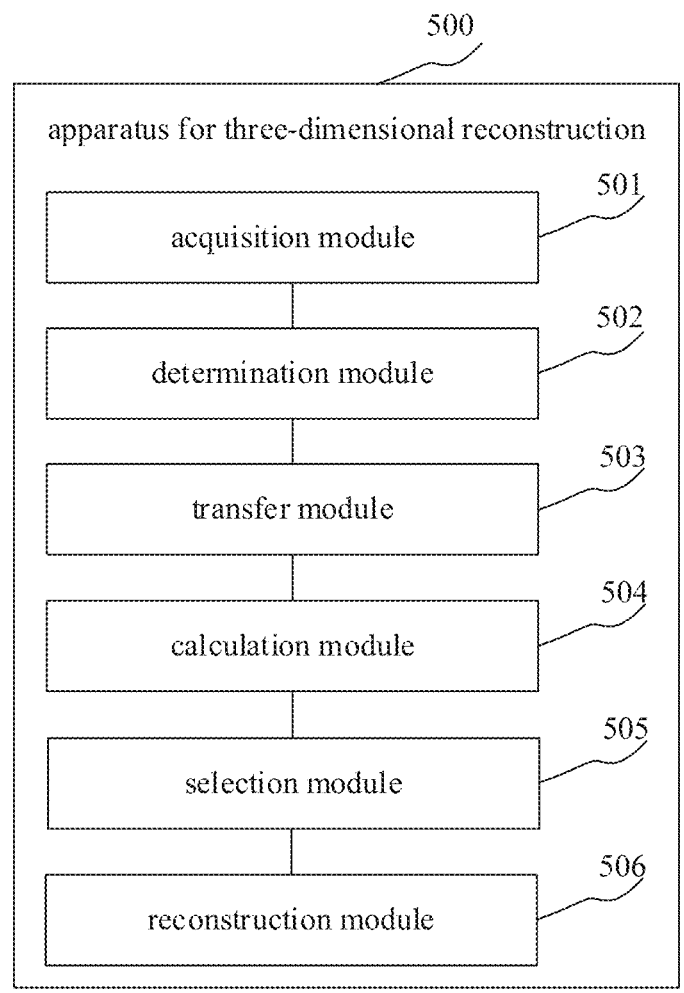
FIG. 5 is a schematic structural diagram of an embodiment of an apparatus for three-dimensional reconstruction according to some embodiments of the present disclosure.

Further referring to FIG. 5, as an implementation of the method shown in each of the above figures, the present disclosure provides an embodiment of an apparatus for three-dimensional reconstruction. The embodiment of the apparatus corresponds to the embodiment of the method shown in FIG. 2, and the apparatus is particularly applicable to various electronic devices.

As shown in FIG. 5, the apparatus 500 for three-dimensional reconstruction according to some embodiments of the present disclosure may include an acquisition module 501, a determination module 502, a transfer module 503, a calculation module 504, a selection module 505 and a reconstruction module 506. The acquisition module 501 is configured to acquire a sequence of RGBD images of a target; the determination module 502 is configured to determine, for an RGBD image in the sequence of the RGBD images, a set of first three-dimensional key points of the target on the RGBD image; the transfer module 503 is configured to transfer the set of the first three-dimensional key points to a camera coordinate system to obtain a set of second three-dimensional key points of the target in the camera coordinate system; the calculation module 504 is configured to calculate an Euler angle of the RGBD image based on the set of the second three-dimensional key points; the selection module 505 is configured to select an RGBD image based on the Euler angle; and the reconstruction module 506 is configured to perform three-dimensional reconstruction of the target based on the selected RGBD image to obtain a three-dimensional model of the target.

In some embodiments, the specific processing of the acquisition module 501, determination module 502, transfer module 503, calculation module 504, selection module 505 and reconstruction module 506 of the apparatus 500 for three-dimensional reconstruction and the technical effects thereof may be described with reference to the related description of steps 201 to 206 in the embodiment corresponding to FIG. 2, and are thus not repeated herein.

In some alternative implementations of this embodiment, the RGBD image includes an RGB image and a depth image, and the determination module includes: a detection submodule configured to perform key point detection on the RGB image to obtain a set of two-dimensional key points of the target on the RGB image; and an alignment submodule configured to align the RGB image with the depth image to obtain the set of the first three-dimensional key points.

In some alternative implementations of this embodiment, the detection submodule is further configured to perform the key point detection on the RGB image by using a key point detection model to obtain the set of the two-dimensional key points.

In some alternative implementations of this embodiment, the RGBD image further includes a camera parameter, and the transfer module 503 includes a projection submodule configured to transfer the set of the first three-dimensional key points to the camera coordinate system through inverse perspective projection based on the camera parameter to obtain the set of the second three-dimensional key points.

In some alternative implementations of this embodiment, the projection submodule is further configured to: acquire a camera focal length and a camera optical center from the camera parameter; and perform the inverse perspective projection by using the camera focal length, the camera optical center and depth values of the three-dimensional key points in the set of the first three-dimensional key points to obtain the set of the second three-dimensional key points.

In some alternative implementations of this embodiment, the calculation module 504 includes: a first calculation submodule configured to calculate a transfer relationship between sets of second three-dimensional key points corresponding to adjacent RGBD images in the sequence of the RGBD images through a singular value decomposition method, where the transfer relationship includes a rotation matrix, a translation parameter and a scaling factor; a second calculation submodule configured to calculate a relative Euler angle between the adjacent RGBD images according to the rotation matrix; and a third calculation submodule configured to calculate an absolute Euler angle of the RGBD image based on the relative Euler angle.

In some alternative implementations of this embodiment, the selection module 505 is further configured to select the RGBD image at an equal angular interval based on the absolute Euler angle.

In some alternative implementations of this embodiment, the apparatus for three-dimensional reconstruction further includes a filter module configured to filter the set of the second three-dimensional key points by using random sample consensus.

In some alternative implementations of this embodiment, the filter module includes a selection submodule configured to select a preset number of the second three-dimensional key points from the set of the second three-dimensional key points to generate a subset of the second three-dimensional key points; a fourth calculation submodule configured to calculate a transformation matrix of subsets of second three-dimensional key points corresponding to adjacent RGBD images in the sequence of the RGBD images; a fifth calculation submodule configured to calculate projection errors between the second three-dimensional key points in the set of the second three-dimensional key points and the transformation matrix, and add a second three-dimensional key point whose projection error is smaller than a preset threshold value to a set of interior points; and a filter submodule configured to filter the set of the second three-dimensional key points based on the set of the interior points.

In some alternative implementations of this embodiment, the filter submodule is further configured to: update the set of the interior points to a set of target interior points, if a number of elements in the set of the interior points is greater than a number of elements in the target set of interior points, and increase an iteration number by one; reselect a subset of the second three-dimensional key points to continue an iteration, if the iteration number does not reach a preset iteration number; and use the target set of interior points as the filtered set of the second three-dimensional key points, if the iteration number reaches the preset iteration number.

In some alternative implementations of this embodiment, the target is a human face, and the key points include at least one of positions, contour information or shape information of human facial organs.

According to an embodiment of the present disclosure, the present disclosure further provides an electronic device and a readable storage medium.

Figure 6:
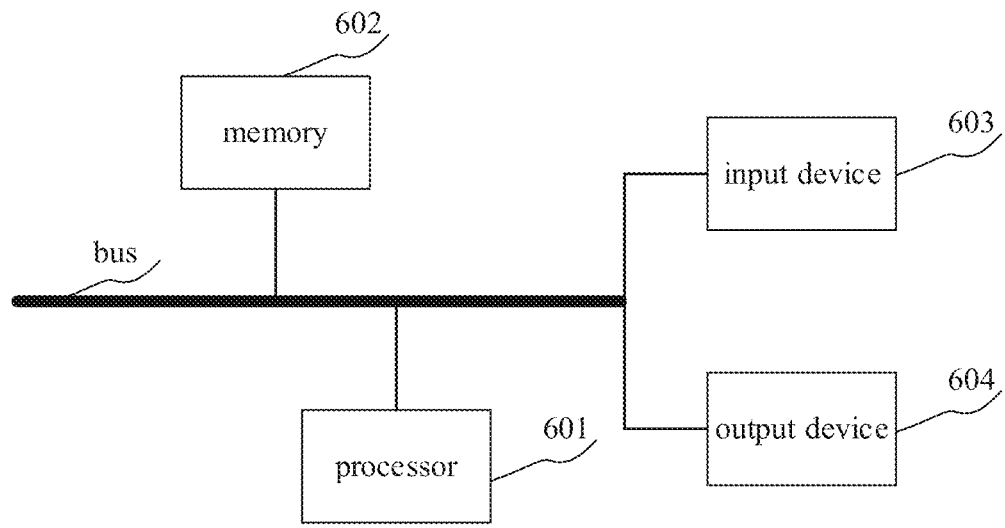
FIG. 6 is a block diagram of an electronic device for implementing the method for three-dimensional reconstruction according to an embodiment of the present disclosure.

FIG. 6 is a block diagram of an electronic device adapted to implement the method for three-dimensional reconstruction according to some embodiments of the present disclosure. The electronic device is intended to represent various forms of digital computers, such as laptops, desktops, worktables, personal digital assistants, servers, blade servers, mainframe computers and other suitable computers. The electronic device may also represent various forms of mobile devices, such as personal digital processing, cellular phones, smart phones, wearable devices and other similar computing devices. The parts, their connections and relationships, and their functions shown herein are examples only, and are not intended to limit the implementations of the present disclosure as described and/or claimed herein.

As shown in FIG. 6, the electronic device includes one or more processors 601, a memory 602 and interfaces for connecting components, including a high-speed interface and a low-speed interface. The components are interconnected by using different buses and may be mounted on a common motherboard or otherwise as required. The processor may process instructions executed within the electronic device, including instructions stored in memory or on memory to display graphical information of the GUI on an external input or output device (such as a display device coupled to an interface). In other embodiments, multiple processors and/or multiple buses and multiple memories may be used with multiple memories, if required. Similarly, multiple electronic devices may be connected (for example, used as a server array, a set of blade servers or a multiprocessor system), and the electronic device provides some of the necessary operations. An example of a processor 601 is shown in FIG. 6.

The memory 602 is a non-transitory computer readable storage medium according to some embodiments of the present disclosure. The memory stores instructions executable by at least one processor to cause the at least one processor to execute the method for three-dimensional reconstruction according to some embodiments of the present disclosure. The non-transitory computer readable storage medium according to some embodiments of the present disclosure stores computer instructions for causing a computer to execute the method for three-dimensional reconstruction according to some embodiments of the present disclosure.

As a non-transitory computer readable storage medium, the memory 602 may be used to store non-transitory software programs, non-transitory computer executable programs and modules, such as the program instructions or modules corresponding to the method for three-dimensional reconstruction in some embodiments of the present disclosure (for example, the acquisition module 501, the determination module 502, the transfer module 503, the calculation module 504, the selection module 505 and the reconstruction module 506 shown in FIG. 5). The processor 601 runs the non-transitory software programs, instructions and modules stored in the memory 602 to execute various functional applications and data processing of the server, thereby implementing the method for three-dimensional reconstruction in the method embodiments.

The memory 602 may include a storage program area and a storage data area, where the storage program area may store an operating system and an application program required by at least one function; and the storage data area may store data created by the electronic device when executing the method for three-dimensional reconstruction. In addition, the memory 602 may include a high-speed random access memory, and may further include a non-transitory memory, such as at least one magnetic disk storage device, a flash memory or other non-transitory solid state storage devices. In some embodiments, the memory 602 may alternatively include a memory disposed remotely relative to the processor 601, which may be connected through a network to the electronic device adapted to execute the method for three-dimensional reconstruction. Examples of such networks include, but are not limited to, the Internet, enterprise intranets, local area networks, mobile communication networks and combinations thereof.

The electronic device adapted to execute the method for three-dimensional reconstruction may further include an input device 603 and an output device 604. The processor 601, the memory 602, the input device 603 and the output device 604 may be interconnected through a bus or other means, and an example of a connection through a bus is shown in FIG. 6.

The input device 603 may receive input digit or character information, and generate key signal input related to user settings and functional control of the electronic device adapted to execute the method for three-dimensional reconstruction, such as a touch screen, a keypad, a mouse, a track pad, a touch pad, a pointer bar, one or more mouse buttons, a trackball or a joystick. The output device 604 may include a display device, an auxiliary lighting device (such as an LED) and a tactile feedback device (such as a vibration motor). The display device may include, but is not limited to, a liquid crystal display (LCD), a light emitting diode (LED) display and a plasma display. In some embodiments, the display device may be a touch screen.

The various embodiments of the systems and technologies described herein may be implemented in digital electronic circuit systems, integrated circuit systems, ASICs (application specific integrated circuits), computer hardware, firmware, software and/or combinations thereof. The various embodiments may include: being implemented in one or more computer programs, where the one or more computer programs may be executed and/or interpreted on a programmable system including at least one programmable processor, and the programmable processor may be a dedicated or general-purpose programmable processor, which may receive data and instructions from a memory system, at least one input device and at least one output device, and send the data and instructions to the memory system, the at least one input device and the at least one output device.

These computing programs (also known as programs, software, software applications or code) include machine instructions of a programmable processor and may be implemented in high-level procedures and/or object-oriented programming languages, and/or assembly or machine languages. As used herein, the terms "machine readable medium" and "computer readable medium" refer to any computer program product, device and/or apparatus (such as magnetic disk, optical disk, memory and programmable logic device (PLD)) for providing machine instructions and/or data to a programmable processor, including a machine readable medium that receives machine instructions as machine readable signals. The term "machine readable signal" refers to any signal used to provide machine instructions and/or data to a programmable processor.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementation of the systems and technologies described herein), or a computing system including any combination of such background component, middleware component or front-end component. The components of the system may be interconnected by any form or medium of digital data communication (such as a communication network). Examples of communication networks include a local area network (LAN), a wide area network (WAN), and the Internet.

The computer system may include a client and a server. The client and the server are typically remote from each other and typically interact through a communication network. The relationship between the client and the server is generated by a computer program running on the corresponding computer and having a client-server relationship with each other.

According to the technical solutions of some embodiments of the present disclosure, for each RGBD image in the acquired sequence of the RGBD images, the set of the first three-dimensional key points of the target on each RGBD image is first determined; the set of the first three-dimensional key points is transferred to the camera coordinate system to obtain the set of the second three-dimensional key points of the target in the camera coordinate system; the Euler angle of each RGBD image is calculated based on the set of the second three-dimensional key points; and after the Euler angle of each RGBD image in the sequence of the RGBD images is obtained, the RGBD image is selected based on the Euler angle; and finally the three-dimensional reconstruction of the target is performed based on the selected RGBD image to obtain the three-dimensional model of the target. By selecting key frames from the sequence of the RGBD images according to the Euler angle of each RGBD image, the accuracy of the selected key frames is improved. Using the key frames for the three-dimensional reconstruction can save storage and network transmission resources while ensuring the effect of the three-dimensional reconstruction, and in the case of the three-dimensional face reconstruction, the storage and network transmission costs in the three-dimensional face reconstruction are greatly reduced.

It should be appreciated that the steps of reordering, adding or deleting may be executed using the various forms shown above. For example, the steps described in the present disclosure may be executed in parallel or sequentially or in a different order, so long as the expected results of the technical solutions provided in the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for three-dimensional reconstruction, the method comprising:
    acquiring a sequence of red green blue depth (RGBD) images of a target;
    determining, for an RGBD image in the sequence of the RGBD images, a set of first three-dimensional key points of the target on the RGBD image;
    transferring the set of the first three-dimensional key points to a camera coordinate system to obtain a set of second three-dimensional key points of the target in the camera coordinate system;
    calculating an Euler angle of the RGBD image based on the set of the second three-dimensional key points;
    selecting a second RGBD image from the set of RGBD images of the target based on the Euler angle; and
    performing three-dimensional reconstruction of the target based on the selected second RGBD image to obtain a three-dimensional model of the target.

2. The method according to claim 1, wherein the RGBD image comprises an RGB (red green blue) image and a depth image; and
    determining the set of first three-dimensional key points of the target on the RGBD image, comprises:
    performing a key point detection on the RGB image to obtain a set of two-dimensional key points of the target on the RGB image; and
    aligning the RGB image with the depth image to obtain the set of the first three-dimensional key points.

3. The method according to claim 2, wherein performing the key point detection on the RGB image to obtain the set of two-dimensional key points of the target on the RGB image, comprises:
    performing the key point detection on the RGB image by using a key point detection model to obtain the set of the two-dimensional key points.

4. The method according to claim 1, wherein the RGBD image further comprises a camera parameter; and
    transferring the set of the first three-dimensional key points to the camera coordinate system to obtain the set of second three-dimensional key points of the target in the camera coordinate system, comprises:
    transferring the set of the first three-dimensional key points to the camera coordinate system through inverse perspective projection based on the camera parameter to obtain the set of the second three-dimensional key points.

5. The method according to claim 4, wherein transferring the set of the first three-dimensional key points to the camera coordinate system through inverse perspective projection based on the camera parameter to obtain the set of the second three-dimensional key points, comprises:
    acquiring a camera focal length and a camera optical center from the camera parameter; and
    performing the inverse perspective projection by using the camera focal length, the camera optical center and depth values of the three-dimensional key points in the set of the first three-dimensional key points to obtain the set of the second three-dimensional key points.

6. The method according to claim 1, wherein calculating the Euler angle of the RGBD image based on the set of the second three-dimensional key points, comprises:
    calculating a transfer relationship between sets of second three-dimensional key points corresponding to adjacent RGBD images in the sequence of the RGBD images through a singular value decomposition method, wherein the transfer relationship comprises a rotation matrix, a translation parameter and a scaling factor;
    calculating a relative Euler angle between the adjacent RGBD images according to the rotation matrix; and
    calculating an absolute Euler angle of the RGBD image based on the relative Euler angle.

7. The method according to claim 6, wherein selecting the second RGBD image from the set of RGBD images of the target based on the Euler angle, comprises:
    selecting the second RGBD image from the set of RGBD images of the target, at an equal angular interval based on the absolute Euler angle.

8. The method according to claim 1, wherein before calculating the Euler angle of the RGBD image based on the set of the second three-dimensional key points, the method further comprises:
    filtering the set of the second three-dimensional key points by using random sample consensus.

9. The method according to claim 8, wherein filtering the set of the second three-dimensional key points by using random sample consensus, comprises:
    selecting a preset number of the second three-dimensional key points from the set of the second three-dimensional key points to generate a subset of the second three-dimensional key points;
    calculating a transformation matrix of subsets of second three-dimensional key points corresponding to adjacent RGBD images in the sequence of the RGBD images;
    calculating projection errors between the second three-dimensional key points in the set of the second three-dimensional key points and the transformation matrix, and adding a second three-dimensional key point whose projection error is smaller than a preset threshold value to a set of interior points; and
    filtering the set of the second three-dimensional key points based on the set of the interior points.

10. The method according to claim 9, wherein filtering the set of the second three-dimensional key points based on the set of the interior points, comprises:
    updating the set of the interior points as a target set of interior points and increasing an iteration number by one, in response to determining that a number of elements in the set of the interior points is greater than a number of elements in the target set of interior points;
    reselecting a subset of the second three-dimensional key points to continue an iteration, in response to determining that the iteration number does not reach a preset iteration number; and
    using the target set of interior points as the filtered set of the second three-dimensional key points, in response to determining that the iteration number reaches the preset iteration number.

11. An electronic device, comprising:
    at least one processor; and a memory storing instructions executable by the at least one processor, the instructions, when executed by the at least one processor, cause the at least one processor to perform operations comprising:
acquiring a sequence of red green blue depth (RGBD) images of a target;
determining, for an RGBD image in the sequence of the RGBD images, a set of first three-dimensional key points of the target on the RGBD image;
transferring the set of the first three-dimensional key points to a camera coordinate system to obtain a set of second three-dimensional key points of the target in the camera coordinate system;
calculating an Euler angle of the RGBD image based on the set of the second three-dimensional key points;
selecting a second RGBD image from the set of RGBD images of the target based on the Euler angle; and
performing three-dimensional reconstruction of the target based on the selected second RGBD image to obtain a three-dimensional model of the target.

12. The electronic device according to claim 11, wherein the RGBD image comprises an RGB (red green blue) image and a depth image; and
determining the set of first three-dimensional key points of the target on the RGBD image, comprises:
performing a key point detection on the RGB image to obtain a set of two-dimensional key points of the target on the RGB image; and
aligning the RGB image with the depth image to obtain the set of the first three-dimensional key points.

13. The electronic device according to claim 12, wherein performing the key point detection on the RGB image to obtain the set of two-dimensional key points of the target on the RGB image, comprises:
performing the key point detection on the RGB image by using a key point detection model to obtain the set of the two-dimensional key points.

14. The electronic device according to claim 11, wherein the RGBD image further comprises a camera parameter; and
transferring the set of the first three-dimensional key points to the camera coordinate system to obtain the set of second three-dimensional key points of the target in the camera coordinate system, comprises:
transferring the set of the first three-dimensional key points to the camera coordinate system through inverse perspective projection based on the camera parameter to obtain the set of the second three-dimensional key points.

15. The electronic device according to claim 14, wherein transferring the set of the first three-dimensional key points to the camera coordinate system through inverse perspective projection based on the camera parameter to obtain the set of the second three-dimensional key points, comprises:
acquiring a camera focal length and a camera optical center from the camera parameter; and
performing the inverse perspective projection by using the camera focal length, the camera optical center and depth values of the three-dimensional key points in the set of the first three-dimensional key points to obtain the set of the second three-dimensional key points.

16. The electronic device according to claim 11, wherein calculating the Euler angle of the RGBD image based on the set of the second three-dimensional key points, comprises:
calculating a transfer relationship between sets of second three-dimensional key points corresponding to adjacent RGBD images in the sequence of the RGBD images through a singular value decomposition method, wherein the transfer relationship comprises a rotation matrix, a translation parameter and a scaling factor;
calculating a relative Euler angle between the adjacent RGBD images according to the rotation matrix; and
calculating an absolute Euler angle of the RGBD image based on the relative Euler angle.

17. The electronic device according to claim 16, wherein selecting the second RGBD image from the set of RGBD images of the target based on the Euler angle, comprises:
selecting the second RGBD image from the set of RGBD images of the target, at an equal angular interval based on the absolute Euler angle.

18. The electronic device according to claim 11, wherein before calculating the Euler angle of the RGBD image based on the set of the second three-dimensional key points, the operations further comprise:
filtering the set of the second three-dimensional key points by using random sample consensus.

19. The electronic device according to claim 18, wherein filtering the set of the second three-dimensional key points by using random sample consensus, comprises:
selecting a preset number of the second three-dimensional key points from the set of the second three-dimensional key points to generate a subset of the second three-dimensional key points;
calculating a transformation matrix of subsets of second three-dimensional key points corresponding to adjacent RGBD images in the sequence of the RGBD images;
calculating projection errors between the second three-dimensional key points in the set of the second three-dimensional key points and the transformation matrix, and adding a second three-dimensional key point whose projection error is smaller than a preset threshold value to a set of interior points; and
filtering the set of the second three-dimensional key points based on the set of the interior points.

20. A non-transitory computer readable storage medium storing computer instructions, wherein the computer instructions, when executed by a computer, cause the computer to perform operations comprising:
acquiring a sequence of red green blue depth (RGBD) images of a target;
determining, for an RGBD image in the sequence of the RGBD images, a set of first three-dimensional key points of the target on the RGBD image;
transferring the set of the first three-dimensional key points to a camera coordinate system to obtain a set of second three-dimensional key points of the target in the camera coordinate system;
calculating an Euler angle of the RGBD image based on the set of the second three-dimensional key points;
selecting a second RGBD image from the set of RGBD images of the target based on the Euler angle; and
performing three-dimensional reconstruction of the target based on the selected second RGBD image to obtain a three-dimensional model of the target.

* * * * *